(12) United States Patent
Jansman et al.

(10) Patent No.: US 11,947,672 B2
(45) Date of Patent: Apr. 2, 2024

(54) VOLTAGE GLITCH DETECTION CIRCUIT

(71) Applicant: NXP B.V., Eindhoven (NL)

(72) Inventors: Andreas Bernardus Maria Jansman, Nuenen (NL); Andreas Lentz, Buchholz (DE)

(73) Assignee: NXP B.V., Eindhoven (NL)

( * ) Notice: Subject to any disclaimer, the term of this patent is extended or adjusted under 35 U.S.C. 154(b) by 338 days.

(21) Appl. No.: 17/189,329

(22) Filed: Mar. 2, 2021

(65) Prior Publication Data

US 2022/0284099 A1 Sep. 8, 2022

(51) Int. Cl.

| G06F 21/56 | (2013.01) |
|---|---|
| G06F 1/28 | (2006.01) |
| G06F 1/3296 | (2019.01) |
| G06F 21/81 | (2013.01) |
| H03K 3/03 | (2006.01) |
| H03K 3/037 | (2006.01) |
| H03K 21/02 | (2006.01) |

(52) U.S. Cl.
CPC .............. *G06F 21/567* (2013.01); *G06F 1/28* (2013.01); *G06F 1/3296* (2013.01); *G06F 21/81* (2013.01); *H03K 3/0315* (2013.01); *H03K 3/037* (2013.01); *H03K 21/02* (2013.01); *G06F 2221/034* (2013.01)

(58) Field of Classification Search
CPC ......... G06F 21/28; G06F 21/81; G06F 21/567
See application file for complete search history.

(56) References Cited

U.S. PATENT DOCUMENTS

| 6,069,536 | A | 5/2000 | Oh |
| 6,424,189 | B1 | 7/2002 | Su et al. |
| 7,276,982 | B1 * | 10/2007 | Karabatsos .......... H03K 23/502 |
| | | | 331/34 |

(Continued)

FOREIGN PATENT DOCUMENTS

| TW | 201512684 A | 4/2015 |
| WO | 2014190666 A1 | 12/2014 |
| WO | 2015006036 A1 | 1/2015 |

OTHER PUBLICATIONS

Gnad, Dennis R.E. et al.; "An Experimental Evaluation and Analysis of Transient Voltage Fluctuations in FPGAs;" IEEE Transactions on Very Large Scale Integration (VLSI) Systems; Published Jul. 12, 2018 (vol. 26, Issue 10, Oct. 2018); DOI: 10.1109/TVLSI.2018.2848460.

(Continued)

*Primary Examiner* — Viral S Lakhia (57) ABSTRACT

A voltage glitch detector includes a ring oscillator, a plurality of counters, a combined result circuit, and a result evaluation circuit. The ring oscillator includes a plurality of series-connected stages. An output of a last stage of the ring oscillator is coupled to an input of a first stage of the ring oscillator. Each counter of the plurality of counters has an input coupled to a node located between two stages of the plurality of series-connected stages. The combined result circuit is coupled to each of the plurality of counters. The combined result circuit combines the count values received from each counter of the plurality of counters to provide a combined result. The result evaluation circuit is coupled to compare the combined result with a reference value to determine when a voltage glitch is detected.

12 Claims, 7 Drawing Sheets

(56) References Cited

U.S. PATENT DOCUMENTS

| | | | |
|---|---|---|---|
| 8,390,313 B2* | 3/2013 | Ikenaga | H03K 19/00392 |
| | | | 326/16 |
| 9,170,564 B2* | 10/2015 | Sato | H03L 7/0992 |
| 9,310,862 B2* | 4/2016 | Cabler | G06F 21/71 |
| 9,379,714 B1* | 6/2016 | Xiu | G04F 10/005 |
| 9,571,113 B2* | 2/2017 | Ikebe | H03M 1/002 |
| 9,667,262 B2* | 5/2017 | Yamauchi | H03L 7/0997 |
| 10,474,846 B1* | 11/2019 | Rezayee | G07F 9/026 |
| 10,481,185 B2* | 11/2019 | Fukuoka | G01R 31/2851 |
| 11,139,817 B1* | 10/2021 | Kong | H03L 7/091 |
| 11,288,405 B2* | 3/2022 | Belgarric | G06F 21/60 |
| 2008/0094053 A1 | 4/2008 | Han et al. | |
| 2016/0087641 A1* | 3/2016 | Familia | H03L 7/099 |
| | | | 331/8 |
| 2017/0023125 A1* | 1/2017 | Diekhans | F16H 57/082 |
| 2017/0032125 A1* | 2/2017 | Lee | G08B 21/18 |
| 2017/0311007 A1* | 10/2017 | Naccache | H04L 9/0894 |
| 2017/0373697 A1* | 12/2017 | Schober | H03L 7/04 |
| 2018/0181670 A1* | 6/2018 | Goel | G06F 16/9538 |
| 2020/0004990 A1* | 1/2020 | Kurd | G06F 1/06 |
| 2020/0012822 A1* | 1/2020 | Vineyard | G06F 21/567 |
| 2020/0285780 A1* | 9/2020 | Rajpathak | G06F 21/81 |
| 2020/0402602 A1 | 12/2020 | Mahatme et al. | |
| 2020/0402929 A1 | 12/2020 | Lentz et al. | |
| 2021/0357502 A1* | 11/2021 | Rangarajan | G06F 1/26 |

OTHER PUBLICATIONS

Kinger, Bhawika et al.; "Design of Improved Performance Voltage Controlled Ring Oscillator;" Published in: 2015 Fifth International Conference on Advanced Computing & Communication Technologies; Feb. 21-22, 2015 in Haryana, India; DOI: 10.1109/ACCT. 2015.127.

Zick, Kenneth M. et al.; "Sensing Nanosecond-scale Voltage Attacks and Natural Transients in FPGAs;" FPGA '13: Proceedings of the ACM/SIGDA International Symposium on Field Programmable Gate Arrays; Feb. 2013; doi.org/10.1145/2435264.2435283.

Notice of Allowance for U.S. Appl. No. 16/908,338 dated Aug. 1, 2022, 5 pages.

U.S. Appl. No. 16/908,338, filed Jun. 22, 2020, 28 pages.

Non-Final Office Action for U.S. Appl. No. 16/908,338 dated Apr. 15, 2022, 16 pages.

Kenjar, Zijo et al.; "VOLTpwn: Attacking x86 Processor Integrity from Software"; Retrieved from internet https://arxiv.org/abs/1912. 04870 on Oct. 2, 2023; Dec. 10, 2019; 16 pages.

* cited by examiner

FIG. 1

| TIME | States of the nodes a, b, c, d, e | | | | | COUNTERS | | | | | COMBINED RESULT |
|---|---|---|---|---|---|---|---|---|---|---|---|
| | A | B | C | D | E | CNT A | CNT B | CNT C | CNT D | CNT E | SUM (CNT) |
| START | 0 | 1 | 0 | 1 | 0 | 0 | 0 | 0 | 0 | 0 | |
| 0 dly | 0 | 1 | 0 | 1 | 0 | 0 | 0 | 0 | 0 | 0 | 0 |
| 1 dly | 1 | 1 | 0 | 1 | 0 | 1 | 0 | 0 | 0 | 0 | 1 |
| 2 dly | 1 | 0 | 0 | 1 | 0 | 1 | 0 | 0 | 0 | 0 | 1 |
| 3 dly | 1 | 0 | 1 | 1 | 0 | 1 | 0 | 1 | 0 | 0 | 2 |
| 4 dly | 1 | 0 | 1 | 0 | 0 | 1 | 0 | 1 | 0 | 0 | 2 |
| 5 dly | 1 | 0 | 1 | 0 | 1 | 1 | 0 | 1 | 0 | 1 | 3 |
| 6 dly | 0 | 0 | 1 | 0 | 1 | 1 | 0 | 1 | 0 | 1 | 3 |
| 7 dly | 0 | 1 | 1 | 0 | 1 | 1 | 1 | 1 | 0 | 1 | 4 |
| 8 dly | 0 | 1 | 0 | 0 | 1 | 1 | 1 | 1 | 0 | 1 | 4 |
| 9 dly | 0 | 1 | 0 | 1 | 1 | 1 | 1 | 1 | 1 | 1 | 5 |
| 10 dly | 0 | 1 | 0 | 1 | 0 | 1 | 1 | 1 | 1 | 1 | 5 |
| 11 dly | 1 | 1 | 0 | 1 | 0 | 2 | 1 | 1 | 1 | 1 | 6 |
| 12 dly | 1 | 0 | 0 | 1 | 0 | 2 | 1 | 1 | 1 | 1 | 6 |
| 13 dly | 1 | 0 | 1 | 1 | 0 | 2 | 1 | 2 | 1 | 1 | 7 |
| 14 dly | 1 | 0 | 1 | 0 | 0 | 2 | 1 | 2 | 1 | 1 | 7 |
| 15 dly | 1 | 0 | 1 | 0 | 1 | 2 | 1 | 2 | 1 | 2 | 8 |
| 16 dly | 0 | 0 | 1 | 0 | 1 | 2 | 1 | 2 | 1 | 2 | 8 |
| 17 dly | 0 | 1 | 1 | 0 | 1 | 2 | 2 | 2 | 1 | 2 | 9 |
| 18 dly | 0 | 1 | 0 | 0 | 1 | 2 | 2 | 2 | 1 | 2 | 9 |
| 19 dly | 0 | 1 | 0 | 1 | 1 | 2 | 2 | 2 | 2 | 2 | 10 |
| 20 dly | 0 | 1 | 0 | 1 | 0 | 2 | 2 | 2 | 2 | 2 | 10 |
| 21 dly | 1 | 1 | 0 | 1 | 0 | 3 | 2 | 2 | 2 | 2 | 11 |
| 22 dly | 1 | 0 | 0 | 1 | 0 | 3 | 2 | 2 | 2 | 2 | 11 |
| 23 dly | 1 | 0 | 1 | 1 | 0 | 3 | 2 | 3 | 2 | 2 | 12 |
| 24 dly | 1 | 0 | 1 | 0 | 0 | 3 | 2 | 3 | 2 | 2 | 12 |
| 25 dly | 1 | 0 | 1 | 0 | 1 | 3 | 2 | 3 | 2 | 3 | 13 |
| 26 dly | 0 | 0 | 1 | 0 | 1 | 3 | 2 | 3 | 2 | 3 | 13 |
| 27 dly | 0 | 1 | 1 | 0 | 1 | 3 | 3 | 3 | 2 | 3 | 14 |
| 28 dly | 0 | 1 | 0 | 0 | 1 | 3 | 3 | 3 | 2 | 3 | 14 |
| 29 dly | 0 | 1 | 0 | 1 | 1 | 3 | 3 | 3 | 3 | 3 | 15 |

VOLTAGE GLITCH DETECTION CIRCUIT

RELATED APPLICATION

This application is related to U.S. patent application Ser. No. 16/908,338, filed on Jun. 22, 2020 by Lentz et al., and entitled "Voltage Glitch Detection In Integrated Circuit."

BACKGROUND

Field

This disclosure relates generally to electronic circuits and more specifically to a voltage glitch detection circuit.

Related Art

Fault injection attacks are non-invasive attempts to inject a "glitch" into a device in order to change program execution in the device. A glitch may be a power supply or other voltage glitch, a clock glitch, electromagnetic fault injection (EMFI), or the like. The attacker may attempt to inject the glitch at a particular point in program execution to cause the program execution to take a wrong branch, to skip a step of the program, or some other wrong decision. The glitch attack may allow an attacker to skip a mathematically complex cryptographical operation such as a signature verification during a secure booting process, and thus execute unauthorized code or gain access to a secure data processing system.

Supply voltage glitch attacks are relatively easy to apply as an attacker does not need to, for example, open a packaged integrated circuit (IC) or larger system to mount the attack. The required equipment is relatively low cost and readily available.

Many currently used glitch sensors are analog sensors for sensing a voltage. Analog glitch sensors are not easily implemented in a digital semiconductor fabrication process and are not easily portable to smaller more advanced processes like, for example, a 16 nanometer (nm) fin FET (field-effect transistor) process.

Therefore, what is needed is a voltage glitch detector that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a voltage glitch detection circuit including a ring oscillator, a plurality of counters connected to the ring oscillator, a combined result circuit connected to each of the plurality of counters, and a result evaluation circuit. In one embodiment, the ring oscillator is a voltage-controlled ring oscillator having a plurality of series-connected stages connected in a continuous ring so that an output of one stage is connected to an input of a subsequent stage. The ring oscillator may be implemented using a conventional complementary metal-oxide semiconductor (CMOS) process technology and a stage may include an inverter. Each of the stages provides a voltage dependent delay. During operation, a toggling signal will go around the ring oscillator. The number of stages traversed in a given amount of time is determined by the voltage level. A frequency of the ring oscillator is dependent on the supplied voltage so that, for example, an increasing voltage increases the oscillating frequency and a decreasing voltage decreases the oscillating frequency. Each counter of the plurality of counters is connected to a corresponding stage of the plurality of series-connected stages of the ring oscillator. An output of each of the counters is connected to an input of a combined result circuit. In one embodiment, the combined result circuit is an adder. In another embodiment, the combined result circuit may be a different type of circuit for combining the results. The logic state of each of the stages toggle in sequence around the ring causing the each of the plurality of counters to count by one in turn. Each toggling counter output causes a value of the combined result circuit to combine the outputs of the plurality counters to produce a combined result. The count values are combined for a predetermined time period. In one embodiment, each of the plurality of counters is a ripple counter that is incremented by one each time a count value is received. Each of the plurality of series-connected stages may including an inverter. Also, in an embodiment, the ring oscillator may include buffers and other types of logic gates. After the predetermined time period, the combined result of the combined result circuit is provided to the result evaluation circuit. In one embodiment, the result evaluation circuit compares the combined result with a reference value. The result evaluation circuit compares the combined result with a reference value. The reference value has been predetermined based on counting at the expected supply voltage for the predetermined time period. If the output of the combined result circuit is different from the reference value by a predetermined margin, then a change in the supply voltage was detected during the time period, and an error signal is output by the comparator. The resolution of the voltage glitch detector is dependent, at least in part, on how many counters are used with the ring oscillator. The resolution may be high enough to allow detection of a momentary glitch such as one produced by an attacker during a voltage glitch attack on the integrated circuit. In one embodiment, each time the combined result circuit receives a count value from one of the counters, the accumulator is incremented by one. In other embodiment, the combined result circuit may combine the counter outputs differently.

The voltage glitch detector is digital, synthesizable, and may be built primarily from logic gates available in a standard cell library. Also, the voltage glitch detector may be built from other elementary devices which have a voltage dependent delay. Because the voltage glitch detector can be implemented using the same circuit types as other circuits on an IC, the voltage glitch detector has similar dependencies on process and temperature. This allows detection margins to be smaller to detect glitches that might not be detected by, for example, an analog voltage detector. Also, because the voltage glitch detector uses multiple counters connected to multiple inverters of the ring oscillator, the ring oscillator can be run at a lower frequency than, for example, a voltage glitch detector that includes only one counter connected to only one inverter output, while providing the same or better detection resolution. Also, using multiple counters on multiple ring oscillator outputs and combining the count values from all the counters improves detection resolution over the same voltage detector having a counter on only one ring oscillator output.

A very short duration voltage transient on the supply voltage can be detected by the disclosed voltage glitch detector. A detectable duration of a voltage glitch may be determined by the resolution of the voltage glitch detector. For a ring oscillator-based voltage glitch detector that has only one output, it takes two full ring oscillation cycles to increment a counter coupled to the output. That is, two ring oscillation cycles are necessary to generate a full cycle of the ring oscillator output. Therefore, it may take two ring oscillator cycles to increment (or decrement) the counter by one least significant bit (LSB). By connecting a counter to more than one of the oscillator output stages as in the herein described embodiments, detection resolution can be improved without changing the ring oscillation frequency or supply voltage to the detector or by changing the delay provided by each stage of the ring oscillator. The improvement may be proportional to the number of ring oscillator stages being counted.

In one embodiment, there is provided, a voltage glitch detector including: a ring oscillator having a plurality of series-connected stages, wherein an output of a last stage of the ring oscillator is coupled to an input of a first stage of the ring oscillator; a plurality of counters, each counter of the plurality of counters having an input coupled to a node located between two stages of the plurality of series-connected stages; a combined result circuit coupled to each of the plurality of counters for combining count values received from each counter of the plurality of counters into a combined result; and a result evaluation circuit coupled to compare the combined result with a reference value to determine when a voltage glitch is detected. The plurality of series-connected stages may be equal to the plurality of counters. The plurality of counters may further include a first counter and a second counter coupled to a same node located between two stages of the plurality of stages, wherein the first counter may trigger upon receiving a positive clock edge at the same node and the second counter may trigger upon receiving a negative edge at the same node. The combined result circuit may be a ripple counter that is incremented by one each time a count value is received from one of the plurality of counters. The voltage glitch detector may further include a logic gate function coupled between a node located between two stages and an input of the counter. A counter of the plurality of counters may further include a plurality of parallel-connected counters, wherein each of the plurality of parallel-connected counters may be enabled one at a time in a sequence. The voltage glitch detector may further include a mode select circuit for selecting a low power mode to disable a predetermined number of the plurality of counters. The voltage glitch detector may further include a plurality of flip-flops, each of the plurality of flip-flops coupled to capture a count value from a corresponding one of the plurality of counters in synchronization with a system clock. Each stage of the plurality of series-connected stage may be an inverter.

In another embodiment, there is provided, an integrated circuit including: a digital circuit; and a voltage glitch detection circuit for detecting a voltage glitch in a supply voltage provided to the digital circuit. The voltage glitch detection circuit includes: a ring oscillator having a plurality of stages connected in a ring with an output node located at an output of each of the plurality of stages; a plurality of counters, wherein each counter of the plurality of counters has an input coupled to an output node of a corresponding stage of the plurality of stages; a combined result circuit coupled to an output of each counter of the plurality of counters, wherein the combined result circuit combines counter values from the plurality of counters for a predetermined time period to generate a combined result value; and a result evaluation circuit having a first input coupled to receive the combined result value, and a second input coupled to receive a reference value, and an output for providing an error signal in response to the combined result count value failing to compare favorably with the reference value. The plurality of series-connected stages may be equal to the plurality of counters. The plurality of counters may further include a first counter and a second counter coupled to a same node located between two stages of the plurality of stages, wherein the first counter may trigger upon receiving a positive clock edge at the same node and the second counter may trigger upon a receiving a negative edge at the same node. Each of the plurality of series-connected stages may include a ripple counter that is incremented by one each time a count value is received from one of the plurality of counters. The integrated circuit may further include a logic gate function coupled between a node located between two stages and an input of the counter. A counter of the plurality of counters may further include a plurality of parallel-connected counters, wherein each counter of the plurality of parallel-connected counters may be enabled one at a time in a sequence. The integrated circuit may further include a mode select circuit for selecting a low power mode to disable a predetermined number of the plurality of counters. The integrated circuit may further include a plurality of flip-flops, each of the plurality of flip-flops coupled to capture a count value from a corresponding one of the plurality of counters in synchronization with a system clock.

In yet another embodiment, a method for detecting a voltage glitch in a digital circuit, the method including: providing a supply voltage to the digital circuit and to a ring oscillator; counting state changes of each node of a plurality of nodes of the ring oscillator to generate a plurality of count values, the ring oscillator having a plurality of series-connected inverting stages connected in a ring, wherein each of the plurality of count values corresponds to each state change, wherein a connection between each of the series-connected inverting stages forms one of the plurality of nodes; capturing the plurality of count values in synchronization with a system clock of the digital circuit; combining the plurality of count values to produce a combined result; and comparing the combined result with a reference value to determine when a voltage glitch of the supply voltage is detected. Counting state changes may further include counting positive edges at each node of the plurality of nodes of the ring oscillator. The plurality of nodes may be equal to the plurality of series-connected stages.

Figure 1:
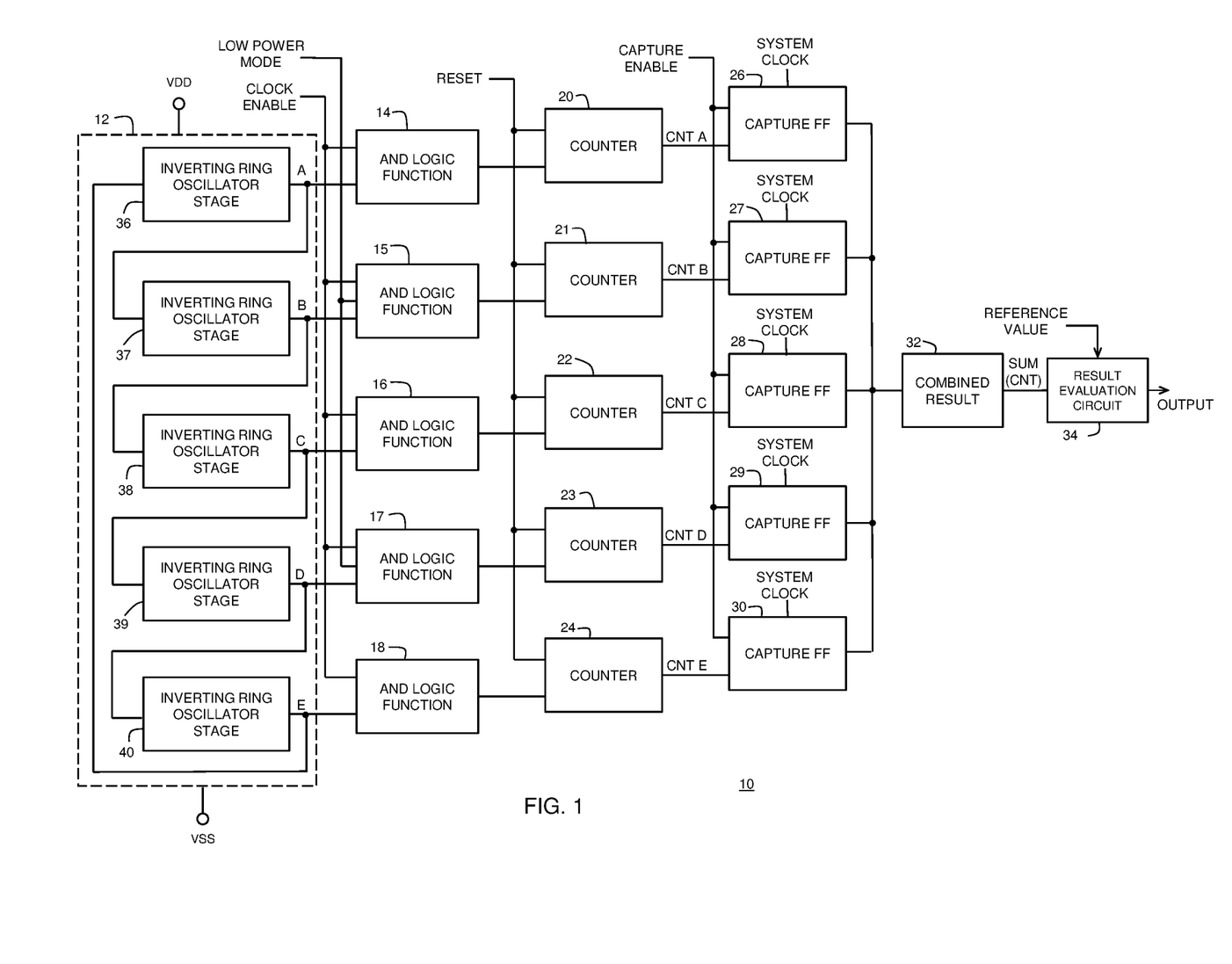
FIG. 1 illustrates a voltage glitch detector in accordance with an embodiment.

FIG. 1 illustrates a voltage glitch detector 10 in accordance with an embodiment. Voltage glitch detector 10 includes ring oscillator 12, AND logic functions 14-18, counters 20-24, capture flip-flops 26-30, combined result circuit 32, and result evaluation circuit 34. In one embodiment, ring oscillator 12 includes an odd number of stages. For example, ring oscillator 12 is illustrated with 5 stages 36-40. Ring oscillator 12 may be implemented with any conventional voltage-controlled ring oscillator having a plurality of stages connected together in series where an output of a last stage is connected to an input of a first stage. Connections between each of the stages forms output nodes labeled "A" through "E". Preferably, each stage is a conventional CMOS inverter (not shown) formed from, e.g., a N-channel transistor and a P-channel transistor connected in series between power supply terminals, such as power supply terminals labeled "VDD" and "VSS" in FIG. 1. Drain terminals of the P-channel and N-channel transistors are connected together to form an output and their gates are connected together to form an input. The input of one inverter stage is connected to an output of another stage in ring oscillator 12. In another embodiment, the stages may be formed differently.

In FIG. 1, a counter is connected to each of the output nodes A-E through AND logic functions 14-19. In another embodiment, there may be fewer counters than there are output nodes of ring oscillator 12.

Each of AND logic functions 14-19 has a first input connected to one of the connection nodes A-E. In addition, each of AND logic functions 14-19 has a second input connected to receive a clock enable signal labeled "CLOCK ENABLE." AND logic functions 14, 16, and 19 have two input terminals. AND logic functions 15 and 17 each have a third input terminal connected to receive a mode signal labeled "LOW POWER MODE."

One counter of the plurality of counters 20-24 is connected to an output of each of AND logic functions 14-18. At the beginning of a detection period, the CLOCK ENABLE signal is asserted, and the connection nodes A-E are coupled to corresponding ones of the plurality of counters 20-24. Each counter has an input for receiving a reset signal labeled "RESET." The reset signal RESET is asserted to return the counters to an initial value, for example, zero, after a detection time period is complete.

After the counters 20-24 are stopped by de-asserting the clock enable signal, the count values are captured by flip-flops 26-30. Flip-flops 26-30 capture the count values in synchronization with a system clock labeled "SYSTEM CLOCK." System clock signal SYSTEM CLOCK may be generated internally in an integrated circuit including voltage glitch detector 10 or may be generated externally.

A frequency of voltage-controlled ring oscillator 12 is dependent of the supply voltage provided to ring oscillator 12. One conventional well-known implementation of a voltage-controlled ring oscillator is known as a current-starved ring oscillator. Each stage output node A-E drives a corresponding one of counters 20-24. The ring oscillator nodes A-E output various phases of a toggling signal going around ring oscillator 12. All of counters 20-24 are enabled at the same time and count the signals from output nodes A-E for a certain period of time defined from a system clock. After each time period, the current counter values are captured by capture flip-flops 26-30 in synchronization with a system clock labeled "SYSTEM CLOCK". In one embodiment, flip-flops 26-30 are DQ type flip-flops. Following the end of the time period, the counters are reset, and a new time period starts. The captured counter values are provided to combined result circuit 32. The value of the combined result SUM (CNT) is directly dependent upon the supply voltage during the measurement period. To detect a voltage transient that may be a glitch attack, the combined result value is compared to a reference value labeled "REFERENCE VALUE." The reference value is determined based on the expected supply voltage. If the combined result for a measurement period is different from the reference value by a predetermined margin, a voltage transient may have occurred. When the voltage transient is detected, an output signal labeled "OUTPUT" is provided. The predetermined margin may be programmable to allow voltage glitch detector 10 to adapt to different kinds of noise profiles on different ICs and applications to ensure a reliable detection rate for glitches while avoiding false positives. In one embodiment, the predetermined margin includes a programmable positive margin and a separately programmable negative margin.

Voltage glitch detector 10 also has a low power mode. When mode signal LOW POWER MODE is asserted as a logic low, AND logic functions 15 and 17 are disconnected from ring oscillator 12 and counters 21 and 23 are not used for counting, thus reducing power consumption of voltage detector 10. However, when voltage glitch detector 10 is operating in low power mode, a detection resolution is reduced because fewer ring oscillator phases are being counted. Therefore, when operating in low power mode, the combined result SUM (CNT) may be compared to a different reference value REFERENCE VALUE than when voltage detector 10 is not in low power mode.

To lessen the impact of environmental changes such as temperature and relatively slow supply voltage changes, the reference value may be regularly adapted to these changes. For example, an update rate for the reference value may be programmed via a timer setting (not shown). For each timer period the highest and lowest measurement result (minimum/maximum) is determined. At the end of the timer period the reference value is averaged with these values and a programmable weight. Having a programmable weight allows suppression of large changes in the reference value due to changes in supply voltage noise due to application changes.

A voltage transient on the supply voltage having a very short duration may be detected by voltage glitch detector 10. A detectable duration of a voltage glitch may be determined by the resolution of the voltage glitch detector. For a voltage glitch detector that has only one output, it takes two full ring oscillation cycles to increment a counter coupled to the output. That is, two ring oscillation cycles are necessary to generate a full cycle of the ring oscillator output. Therefore, it may take two ring oscillator cycles to increment (or decrement) the counter by one least significant bit (LSB). By connecting a counter to more than one of the oscillator output stages as illustrated in FIG. 1, detection resolution of voltage glitch detector 10 can be improved without changing the ring oscillation frequency or supply voltage to the detector or by changing the delay provided by each stage of the ring oscillator. The improvement may be proportional to the number of ring oscillator stages being counted.

Figure 2:
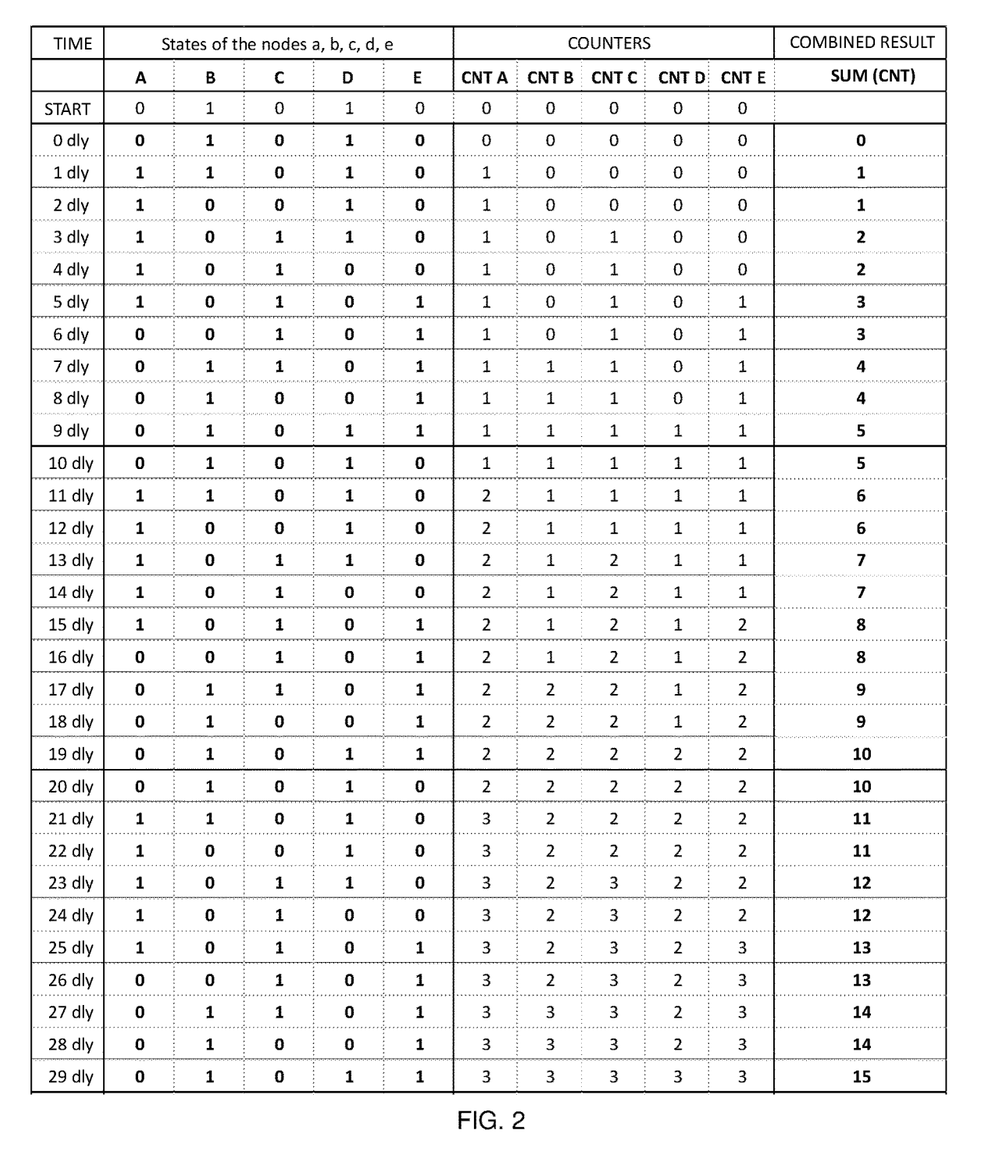
FIG. 2 is a table of ring oscillator states and corresponding counter values for the voltage glitch detector of FIG. 1.

FIG. 2 is a table of ring oscillator states and corresponding counter values for voltage glitch detector 10. A sequence of states in FIG. 2 is ordered according to delays provided by the ring oscillator stages 36-40. There are thirty states shown in FIG. 2 labeled from "0 dly" to "29 dly", where "dly" stands for "delay", and where all the ring oscillator stages provide equal delays. Counters 20-24 are positive edge, or rising edge, triggered. In another embodiment, counters 20-24 may be negative edge, or falling edge, triggered. Note that in the illustrated embodiment, the combined result SUM (CNT) increments by one if the toggling signal around ring oscillator travels two delay elements (stages).

Figure 3:
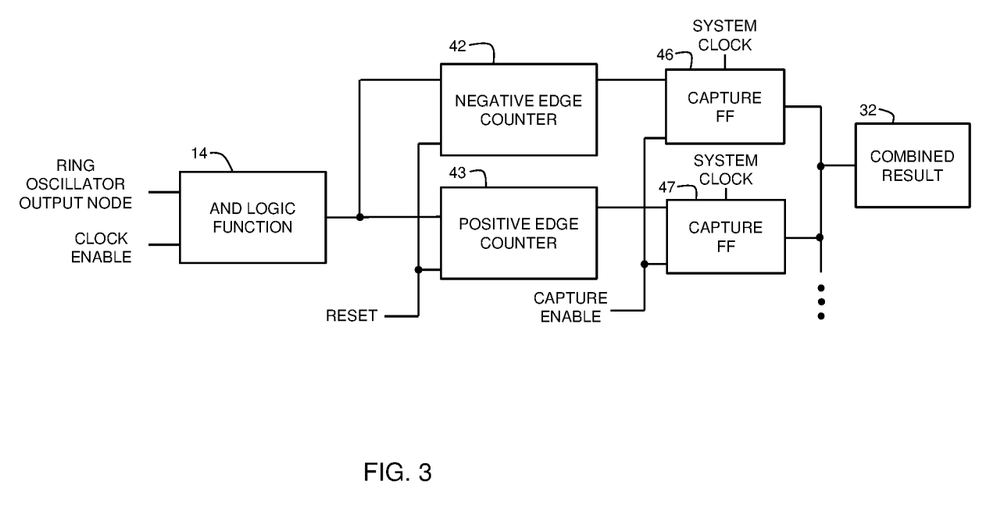
FIG. 3 illustrates positive and negative edge counters for use in another embodiment of the voltage glitch detector of FIG. 1.

FIG. 3 illustrates a positive edge counter and a negative edge counter connected to the same node of ring oscillator 12 in another embodiment of voltage glitch detector 10. As an example, negative edge counter 42 and positive edge counter 43 can be used together in place of, e.g., counter 20. Each of the other counters 21-24 would be replaced similarly. In FIG. 3, as an example, an output of negative edge counter 42 is connected to an input of capture flip-flop 46 and an output of positive edge counter 47 is connected to an input of capture flip-flop 47. Inputs of counters 42 and 43 are connected to an output of AND logic function 14. Both of flip-flops 46 and 47 have an output connected to combined results summation circuit 32. Because counter 42 triggers on a positive edge of the ring oscillator signal and counter 43 triggers on a negative edge of the ring oscillator signal, the two counters are triggered 180 degrees output of phase from the ring oscillator signal.

The detection resolution of voltage glitch detector 10 is determined, at least in part, by the number ring oscillator outputs. Generally, a digital counter responds to either a positive or negative clock edge so to increment a counter by one LSB requires two clock edges. In FIG. 3, the combined result circuit 32 increments by one if the toggling ring oscillator signals, that is, two stages of the ring oscillator 12. Using the positive and negative edge counters 46 and 47, the combined result circuit 32 triggers on each cycle, thus doubling the resolution of voltage glitch detector 10. If ring oscillator stages 36-40 all have the same delay, and the counters are evenly spaced around ring oscillator 12, the incrementing of combined result circuit 32 occurs uniformly over the detection time period of voltage glitch detector 10. If the counting is not uniform, the count resolution is dependent on the maximum delay between two adjacent sample points. In one embodiment, a non-uniform distribution of delay may be intentionally implemented. For example, longer delays may be concentrated during the first half of the detection time period if glitches can be assumed to be harmless during the first half, while shorter delays are concentrated during second half of the detection time period. Longer delays may be implemented by placing non-inverting delay elements between sample nodes.

Figure 4:
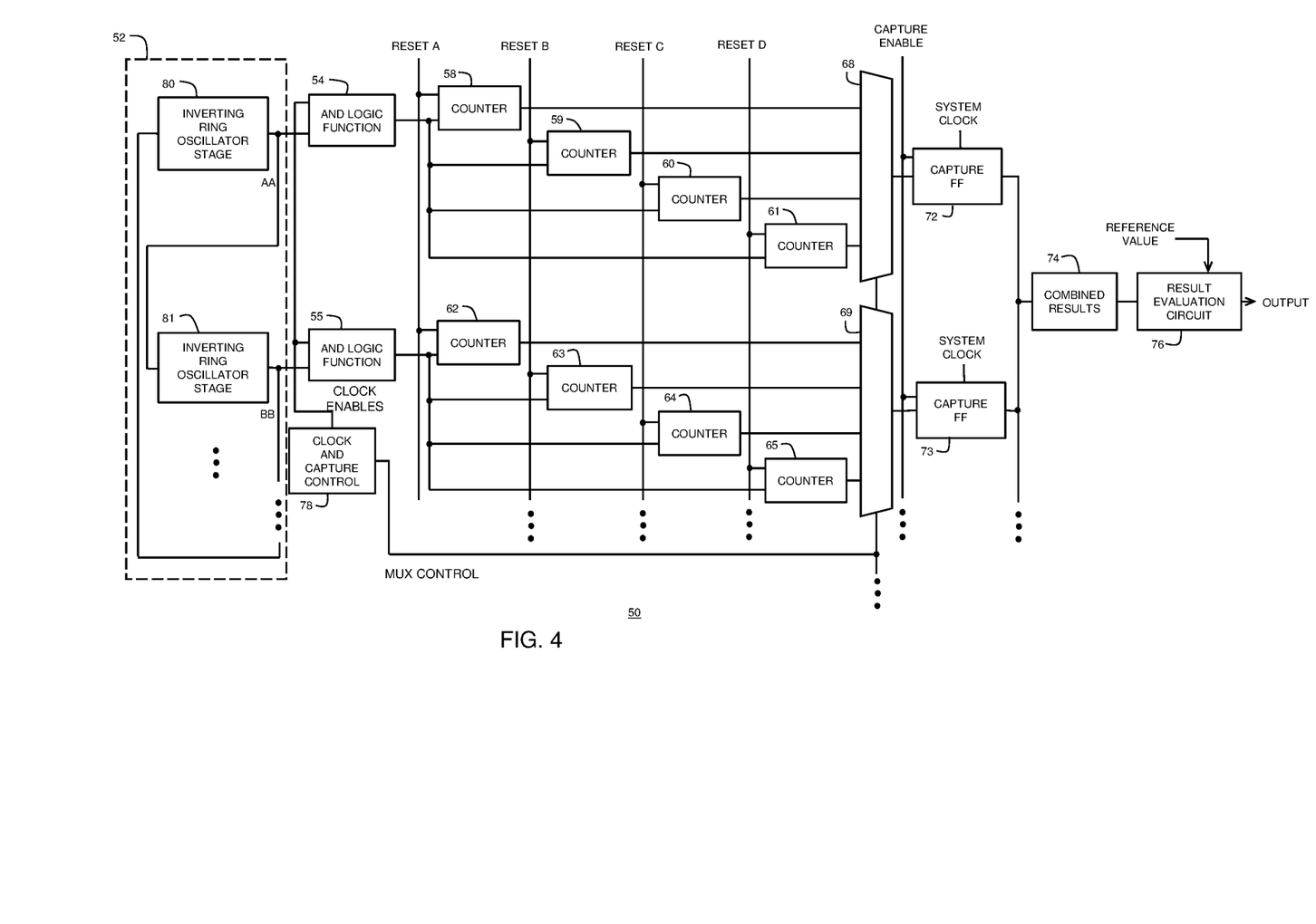
FIG. 4 illustrates a voltage glitch detector in accordance with another embodiment.

FIG. 4 illustrates voltage glitch detector 50 in accordance with another embodiment. Voltage glitch detector 50 includes ring oscillator 52, AND logic functions 54 and 55, set of parallel-connected counters 58-61, set of parallel-connected counters 62-65, multiplexors 68 and 69, capture flip-flops 72 and 73, combined result circuit 74, result evaluation circuit 76, and clock and capture control circuit 78. Inverting stages 80 and 81 are representative of a plurality of stages in ring oscillator 52. As described above for ring oscillator 12 and illustrated in FIG. 1, ring oscillator 52 has a plurality of series-connected stages connected in a ring where the output of a last stage is connected to the input of a first stage. Each connection between stages forms an output terminal of a plurality of output nodes, or terminals. There can be any number of stages. Preferably, the plurality of stages is an odd number of stages. Two representative output nodes in FIG. 4 are labeled "AA" and "BB." A set of parallel-connected counters, such as one of sets 58-61 and 62-65, is connected to each of a plurality of the output nodes of ring oscillator 52. In one embodiment, a plurality of parallel-connected counters can be connected to all the output nodes of ring oscillator 52. In another embodiment, the plurality of parallel-connected counters may be connected to fewer than all the output nodes of ring oscillator 52.

Preferably, each stage of ring oscillator 52 is implemented as a conventional inverter in CMOS as described above regarding voltage glitch detector 10. In another embodiment, the ring oscillator stages may be implemented differently. The set of parallel-connected counters 58-61 each have a first input terminal connected to output node AA through AND logic function 54 in response to a clock enable signal CLOCK ENABLE provided to AND logic function 54. The set of parallel-connected counters 62-65 each have a first input terminal connected to output node BB through AND logic function 55 in response to a clock enable signal CLOCK ENABLE provided to AND logic function 55. In another embodiment, AND logic functions 54 and 55 can be a different logic gate function such as a NAND logic gate function. An output terminal of each of counters 58-61 is connected to an input of multiplexer 68, and an output of each of counters 62-65 is connected to an input of multiplexer 69. Counters 58 and 62 each have a second input terminal connected to receive a reset signal labeled "RESET A", counters 59 and 63 each have a second input terminal connected to receive a reset signal labeled "RESET B, counters 60 and 64 each have a second input for receiving a reset signal labeled "RESET C", and counters 61 and 65 have a second input for receiving a reset signal labeled "RESET D." The different reset signals RESET A-RESET D allow the counters to be reset at different times. Capture flip-flop 72 is connected to an output terminal of multiplexer 68 and capture flip-flop 73 is connected to an output terminal of multiplexer 69. combined result circuit 74 is coupled to receive count values from each of the multiplexers. Clock and capture control circuit 78 has an output for providing control signals labeled "MUX CONTROL" to multiplexers 68 and 69.

Generally, voltage detectors 10 and 50 each have four operating phases. A first phase is a counting phase in which the counters count the ring oscillator outputs. A second phase is a settling phase where the ring oscillator outputs are stopped to allow the ripple counters to settle so the counter values can be captured into the system clock domain. The third phase is a count value capture phase where count values from the counters are captured in response to a system clock. The fourth phase is a reset phase. During the reset phase of voltage glitch detector 10, reset signal RESET causes the counters to reset to an initial value, for example, the initial value may be zero, and the four phases are repeated. Only the counting phase is supply voltage dependent. Glitch detection is not possible in voltage glitch detector 10 during the settling phase, capture phase, and reset phase. Glitch detection is only possible during the counting phase of voltage glitch detector 10.

To overcome this limitation, voltage glitch detector 50 allows continuous glitch detection in every system clock cycle by timing each of the counters connected to a ring oscillator output node to be operated in different phases at the same time. For example, when counter 58 is in a counting phase, counter 59 may be in a settling phase, counter 60 may be in a count capture phase, and counter 61 may be in a reset phase. Capture flip-flops 72 and 73 will capture count values presented to them by multiplexers 68 and 69 in response to the multiplexer control signals MUX CONTROL and the system clock signal SYSTEM CLOCK. At least one counter of the sets of parallel-connected counters is in a counting phase during operation of voltage detector 50. This provides voltage glitch detection coverage over an entire operating period at the cost of additional hardware counters and multiplexers, complexity, and cost when compared to voltage glitch detector 10.

Figure 5:
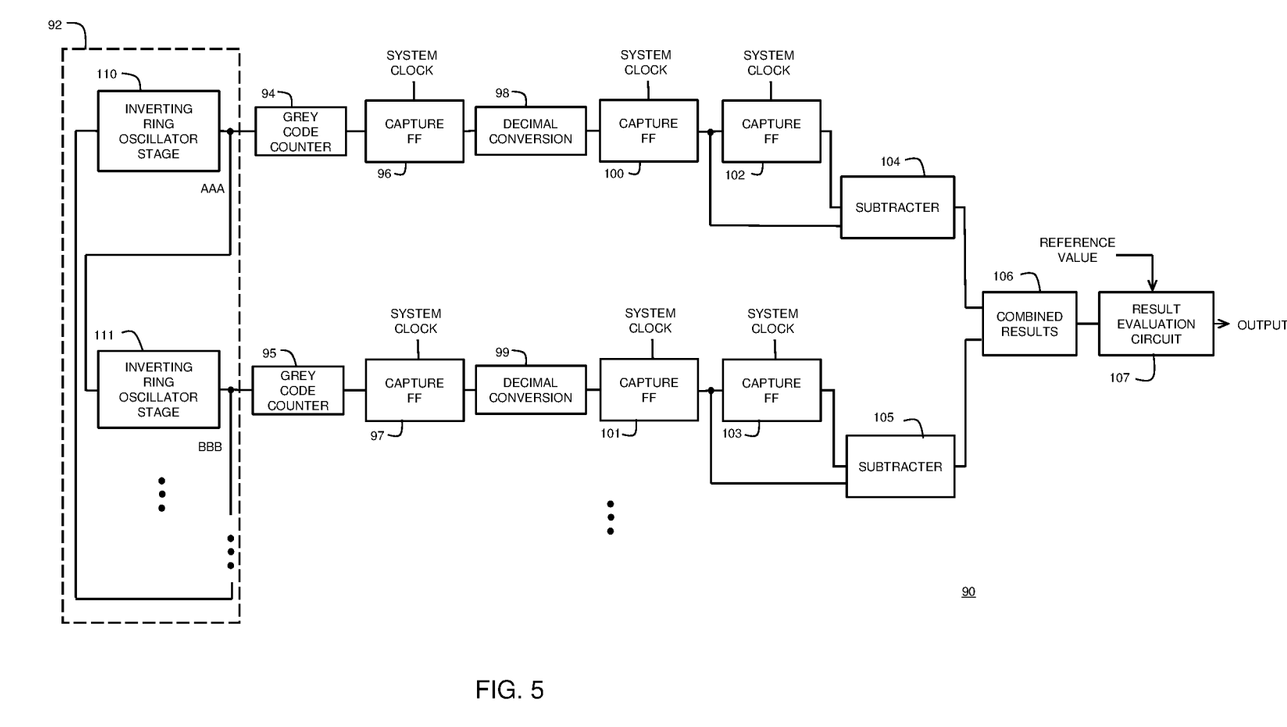
FIG. 5 illustrates a voltage glitch detector in accordance with another embodiment.

FIG. 5 illustrates voltage glitch detector 90 in accordance with another embodiment. Voltage glitch detector 90 includes ring oscillator 92, grey code counters 94 and 95, capture flip-flops 96, 97, and 100-103, decimal conversion circuits 98 and 99, subtractors 104 and 105, combined results summation circuit 106, and result evaluation circuit 107. As described above for ring oscillator 12 and illustrated in FIG. 1, ring oscillator 92 has a plurality of series-connected stages connected in a ring where the output of a last stage is connected to the input of a first stage. Each connection between stages forms an output terminal of a plurality of output nodes, or terminals. There can be any number of stages. Preferably, the plurality of stages is an odd number of stages. Two representative output nodes in FIG. 5 are labeled "AAA" and "BBB." Grey code counters 94 and 95 are representative of a plurality of Grey code counters. Each counter of a plurality of Grey code counters are connected to a corresponding node of a plurality of nodes of ring oscillator 92. In one embodiment, all the nodes of ring oscillator 92 are connected to a Grey code counter.

Voltage glitch detector 90 does not have four operating phases like those described above for voltage glitch detectors 10 and 50. Voltage glitch detector 90 captures a count value on every clock cycle of system clock SYSTEM CLOCK using counters that are decoded with Grey code. With a Grey code counter, only one bit at a time changes logic state for each increment. Decimal conversion circuits 98 and 99 convert the Grey code to a standard binary format. Capture flip-flops 100-103 store the current cycle and the previous cycle. A difference between the current and previous count value is calculated by subtractors 104 and 105. The difference reflects the Grey code count value differences between the current and previous sample points. The differences are summed with combined result circuit 106 to provide a combined result that is compared with a reference value. If the combined result is different from the reference value REFERENCE VALUE by more than a predetermined margin, then a voltage transient occurred on the power supply voltage.

Voltage glitch detector 90 provides good count resolution and lower ring oscillator frequency as described above for voltage glitch detector 10. Voltage glitch detector 90 also allows continuous glitch detection as described above for voltage glitch detector 50 without requiring the four operating phases.

Figure 6:
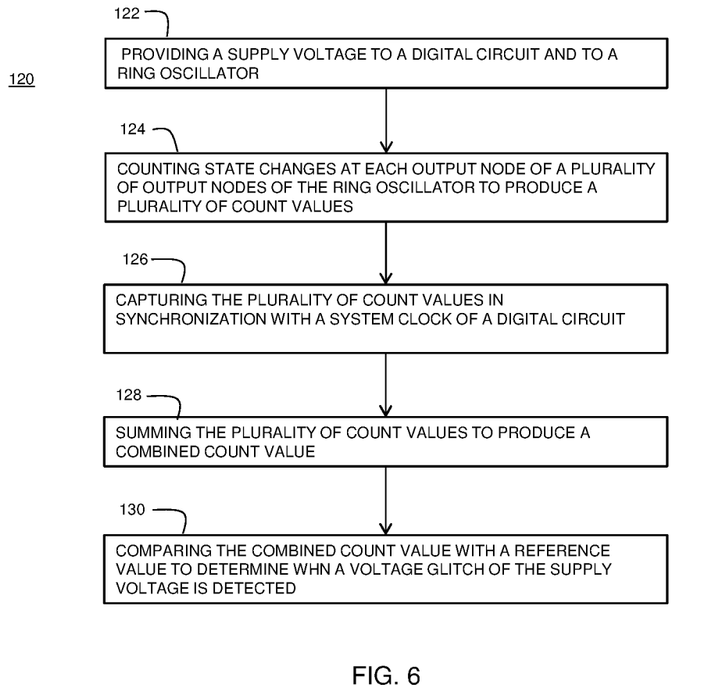
FIG. 6 illustrates a method for detecting a voltage glitch in an IC in accordance with an embodiment.

FIG. 6 illustrates method 120 for detecting a voltage glitch in a digital circuit in accordance with an embodiment. Method 120 begins at step 122. At step 122, a supply voltage is provided to the digital circuit and to a ring oscillator. The ring oscillator may have a plurality of series-connected inverting stages connected in a ring so that an output terminal of one stage is connected to an input terminal of a subsequent stage and the output terminal of a last stage is connected to an input terminal of a first stage. The ring oscillator may be a ring oscillator such as the ring oscillators shown in FIG. 1, FIG. 4, or FIG. 5. The supply voltage may be a power supply voltage used to power an integrated circuit on which the digital circuit is implemented. At step 124, state changes at each output node of a plurality of output nodes of the ring oscillator is counted to produce a plurality of count values during a counting time period. The plurality of output nodes may be all the output nodes of the ring oscillator or less than all the nodes of the ring oscillator. At step 126, the plurality of count values is captured in synchronization with a system clock of the digital circuit. In one embodiment, the digital circuit may be a processor or a plurality of processor cores for executing instructions. At step 128, the plurality of count values is combined with a combined result circuit to produce a combined result. In one embodiment, the combined result circuit may be a ripple counter. At step 130, the combined result is compared with a reference value to determine when a voltage glitch of the supply voltage is detected. The reference value may be determined by determining a count value of a detection period for a particular supply voltage level, and a glitch is detected when the combined count value is different from the reference value.

Figure 7:
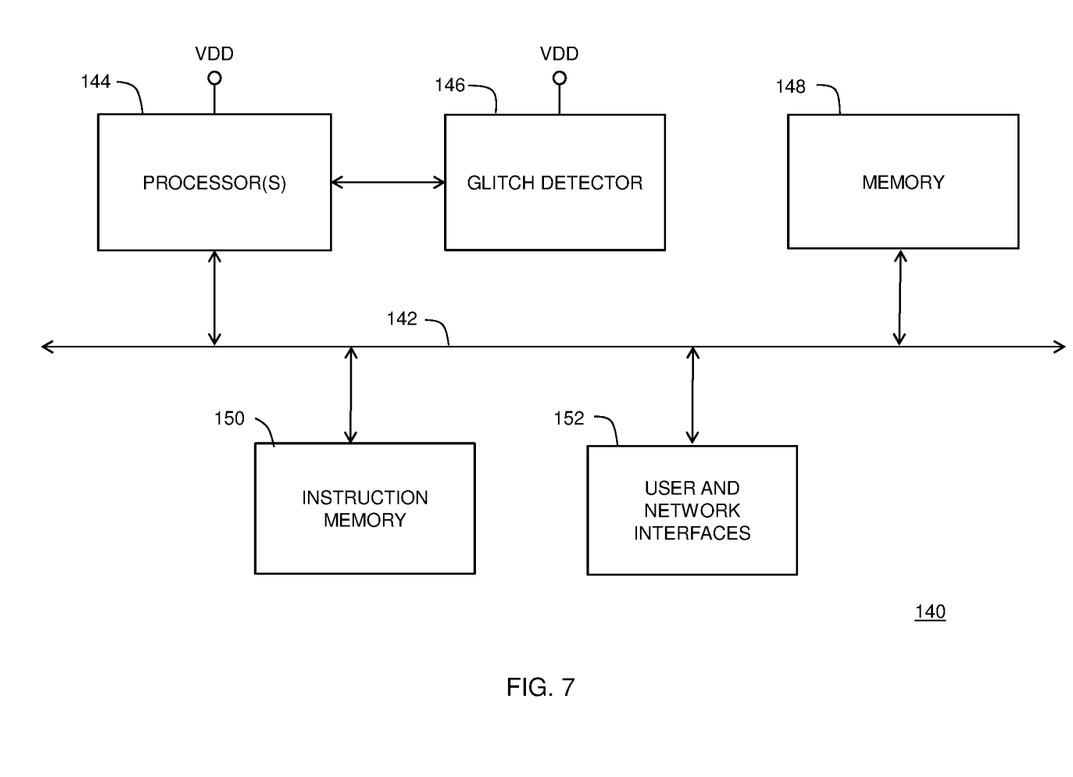
FIG. 7 illustrates an integrated circuit having the voltage glitch detector of FIG. 1 in accordance with an embodiment.

FIG. 7 illustrates integrated circuit (IC) 140 having a voltage glitch detector in accordance with an embodiment. Integrated circuit 140 may be implemented on one or more integrated circuits and may be used in an implementation of the described embodiments. In one embodiment, integrated circuit 140 is a data processing system such as for example, a system of a chip (SoC). Integrated circuit 140 includes bus 142. Connected to bus 142 is one or more processor(s) 144, voltage glitch detector 146, memory 148, instruction memory 150, and user and network interfaces 152. The one or more processor(s) 144 may include any hardware device capable of executing instructions stored in memory 148 or instruction memory 150 and may include multiple processor cores. Processor(s) 144 may be, for example, a microprocessor, field programmable gate array (FPGA), application-specific integrated circuit (ASIC), or similar device. Processor(s) 144 may be implemented in a secure hardware element and may be tamper resistant.

In one embodiment, processor(s) 144 is a digital circuit. That is, processor(s) 144 processes information, such as instructions and data, in the form of bits, where a logic high voltage state represents at "1" and a logic low voltage state represents a "0." The voltage levels of the voltage states may be determined, at least in part, by a power supply voltage provided to processor(s) 144 labeled "VDD." Processor(s) 144 may also receive a clock signal such as the system clock signal SYSTEM CLOCK in FIG. 1.

Voltage glitch detector 146 is coupled to receive power supply voltage VDD and is connected to processor(s) 144. Voltage glitch detector 146 may be implemented as described above regarding voltage glitch detectors 10, 50, and 90. Voltage glitch detector 146 monitors power supply voltage VDD and detects when a voltage level of power supply voltage VDD deviates from an expected voltage level. Voltage glitch detector 146 can detect relatively short voltage glitches as may be experienced by processor(s) 144 during a fault injection attack on integrated circuit 140.

Memory 148 may be any kind of memory, such as for example, L1, L2, or L3 cache or system memory. Memory 148 may include volatile memory such as static random-access memory (SRAM) or dynamic RAM (DRAM), or may include non-volatile memory such as flash memory, read only memory (ROM), or other volatile or non-volatile memory. Also, memory 148 may be implemented in a secure hardware element. Alternately, memory 148 may be a hard drive implemented externally to integrated circuit 140. In one embodiment, memory 148 is used to store software or data required for the operation of integrated circuit 140.

Instruction memory 150 may include one or more machine-readable non-transient storage media for storing instructions for execution by processor(s) 144. In other embodiments, both memories 148 and 150 may store data upon which processor(s) 144 may operate. Memories 148 and 150 may also store, for example, encryption, decryption, and verification applications. Memories 148 and 150 may be implemented in a secure hardware element and may be tamper resistant.

User and network interfaces 152 may be connected to one or more devices for enabling communication with a user such as an administrator. For example, user and network interfaces 152 may be enabled for coupling to a display, a mouse, a keyboard, or other input/output device. User and network interfaces 152 may also include one or more devices for enabling communication with other hardware devices. For example, user and network interfaces 152 may include, or be coupled to, a network interface card (NIC) configured to communicate according to the Ethernet protocol. Also, user and network interfaces 152 may implement a TCP/IP stack for communication according to the TCP/IP protocols. Data samples for classification may be input via user and network interfaces 152, or similar interface. Various other hardware or configurations for communicating are available.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit comprising:
   a voltage glitch detection circuit configured to detect a voltage glitch;
   wherein the voltage glitch detection circuit includes,
      a ring oscillator having a plurality of stages connected in a ring with an output node located at an output of each of the plurality of stages;
      a plurality of counters, each of the plurality of counters having an input coupled to the output node of each of the plurality of stages in the ring oscillator;
      a combined result circuit coupled to an output of each of the plurality of counters,
      wherein the combined result circuit is configured to combine counter values from the plurality of counters for a predetermined time period to generate a combined result value; and
      a result evaluation circuit configured to compare the combined result value, with a reference value, and configured to generate a voltage glitch indication signal if the comparison is outside of a threshold range.

2. The integrated circuit of claim 1, wherein the plurality of series-connected stages is equal to the plurality of counters.

3. The integrated circuit of claim 1, wherein the plurality of counters further comprises a first counter and a second counter coupled to a same node located between two stages of the plurality of stages, wherein the first counter triggers upon receiving a positive clock edge at the same node and the second counter triggers upon a receiving a negative edge at the same node.

4. The integrated circuit of claim 1, wherein each of the plurality of counters is a ripple counter that is incremented by one each time a count value is received from one of the plurality of counters.

5. The integrated circuit of claim 1, further comprising a logic gate function coupled between a node located between two stages and an input of the counter.

6. The integrated circuit of claim 1, wherein at least one counter in the plurality of counters includes a plurality of parallel-connected counters, wherein each counter of the plurality of parallel-connected counters is enabled one at a time in a sequence.

7. The integrated circuit of claim 1, further comprising a mode select circuit for selecting a low power mode to disable a predetermined number of the plurality of counters.

8. The integrated circuit of claim 1, further comprising a plurality of flip-flops, each of the plurality of flip-flops coupled to capture a count value from a corresponding one of the plurality of counters in synchronization with a system clock.

9. A method for detecting a voltage glitch, the method comprising:
   counting in parallel state changes from each node of a ring oscillator to generate a plurality of count values,
   wherein the ring oscillator is separate from a set of counters configured to perform the counting and includes a plurality of series-connected inverting stages connected in a ring wherein the each node is between each pair of inverting stages,
   wherein each of the plurality of count values corresponds to each state change from one of the nodes of the ring oscillator,
   capturing the plurality of count values in synchronization with a system clock of the digital circuit;
   combining the plurality of count values to produce a combined result;
   comparing the combined result with a reference value; and
   generating a voltage glitch indication signal if the comparison is outside of a threshold range.

10. The method of claim 9, wherein counting state changes further comprises counting positive edges at each node of the plurality of nodes of the ring oscillator.

11. The method of claim 9, wherein the plurality of nodes is equal to the plurality of series-connected stages.

12. An integrated circuit comprising:
   a digital circuit; and
   a voltage glitch detection circuit for detecting a voltage glitch in a supply voltage provided to the digital circuit, the voltage glitch detection circuit comprising:

a ring oscillator having a plurality of stages connected in a ring with an output node located at an output of each of the plurality of stages;

a plurality of counters, wherein each counter of the plurality of counters has an input coupled to an output node of a corresponding stage of the plurality of stages;

a combined result circuit coupled to an output of each counter of the plurality of counters, wherein the combined result circuit combines counter values from the plurality of counters for a predetermined time period to generate a combined result value; and a result evaluation circuit having a first input coupled to receive the combined result value, and a second input coupled to receive a reference value, and an output for providing an error signal in response to the combined result count value failing to compare favorably with the reference value;

wherein the plurality of counters further comprises a first counter and a second counter coupled to a same node located between two stages of the plurality of stages, wherein the first counter triggers upon receiving a positive clock edge at the same node and the second counter triggers upon a receiving a negative edge at the same node.

* * * * *